Patented Apr. 16, 1940

2,196,973

UNITED STATES PATENT OFFICE 2,196,973

BONDED MATERIAL AND METHOD OF MAKING

Willis A. Boughton, Cambridge, and William R. Mansfield, Boston, Mass., assignors, by mesne assignments, to New England Mica Company, Waltham, Mass., a corporation of Massachusetts No Drawing. Application August 8, 1938, Serial No. 223,720

31 Claims. (Cl. 154—2.6)

This invention relates to improvements in the manufacture of bonded materials the parts of which have been bonded with bonding compounds that are subjected to high temperatures to effect the bonding. Such compounds are particularly useful in the art of bonding, binding, or cementing surfaces of particles which are non-reacting therewith, and non-soluble therein, thereby effecting the integration of discrete particles of matter into practically unitary bodies.

In the following description of the invention disclosed herein, reference is made specifically to the manufacture of laminated mica insulation products; but it must be understood that the application of the properties, principles and methods disclosed herein may be made to other uses and materials, for example, the impregnation and bonding into unitary products of inorganic fibrous materials such as asbestos, spun glass, slag wool, with or without other heat-resisting matter. Other applications of the invention will be obvious to those skilled in arts where high-temperature adhesives are desirable.

One object of the invention is to produce bonded materials the binders of which shall exhibit a thermal behavior such that at red heat they will flow and effect adherence of adjacent surfaces, and on cooling form clear, hard, glass-like substances characterized by a high degree of adhesion to adjacent surfaces and resilient when in the form of a film between such surfaces; shall be essentially unaltered upon repeated subjection thereafter to temperatures of redness and upon exposure to conditions of high relative humidity; and shall possess high electrical insulation resistance values at high temperatures and at high relative humidities; and shall be non-charring, non-combustible and fireproofing.

A further object is to produce bonded materials embodying high temperature binders having properties which make them especially beneficial in the manufacture of laminated mica plate for use primarily as insulation in electric heater appliances, but also in various other types of electric devices.

A further object of the invention relates to the production of other composite insulating materials bonded or impregnated with the fused reaction product of one or the other of the several binder compounds described herein.

Further objects of the invention will be apparent to those skilled in the related arts after reading this specification.

Composite high temperature-resistant mica plate has attained a position of distinct and increasing importance in the field of electrical insulation by virtue of its availability in large sheets having uniformity of quality and dimensions and adaptability to more efficient assembling processes. In spite of the fairly old art of manufacturing composite mica plate an extremely limited number of inorganic bonding compounds have been found to be capable of use, and none thus far available exhibits all of the requisite properties or desirable features embraced in this invention.

In U. S. Patent 1,578,812, Dawes and Boughton described the use of glass-like phosphates of the alkali metals, and of mixtures of glass-like phosphates of the alkali metals with borates of the alkali metals as binders for mica films to produce high temperature-resistant insulating bodies, and stated that such composite insulation provided high electrical resistance at the high temperatures at which the product was designed to be used.

At that time electric heater appliances were so constructed as to operate at much lower temperatures than are now employed, and the electrical insulation resistances of the products described by Dawes and Boughton were sufficiently high at the then operating temperatures of appliances to satisfy the requirements.

The trend in electric heater appliances in recent years, however, to higher temperatures of operation, greater heat-up speeds and thermostatic operation, together with the requirements for specified maximum current leakages to eliminate the possibility of shock hazard, has placed a greater burden on the insulation, and on account of these recent maximum requirements the electrical insulation resistance of the products described by Dawes and Boughton in said patent have been found to be inadequate. However, the bonding compositions herein described exhibit thermal characteristics and physical properties and a behavior in all other respects such that they constitute outstanding binders for high temperature-resistant mica plates, lacking only in adequate electrical insulation value at high temperatures and upon exposure to high relative humidities.

The following tabulated data demonstrate the marked and rapid falling off of electrical insulation resistance of a prior type of bonded high temperature-resistant mica plate with increase in temperature. The practical effect of this behavior is a decreasing resistance to the passage or leakage currents in an electrical appliance in which the bonded product may serve as insulation. Thus, any material increase whatever in the electrical resistance of the bonded insulation at high temperatures is of important significance in that it thereby reduces current leakage and the possibility of shock hazard in the appliance which it insulates. Similarly, it permits a corresponding increase in the operating temperature of the appliance.

The values in Table I, demonstrating the decrease in electrical insulation resistance of a prior type of mica plate at increasingly elevated temperatures, represent measurements made on a mica plate bonded with a fused mixture of sodium metaphosphate and sodium borate. One operative formula for the binder before fusion comprised one part of sodium dihydrogen phosphate and two parts of crystallized borax (sodium tetraborate).

TABLE I

| Temperature | Electrical insulation resistance in megohms |
|---|---|
| 482° C. (900° F.) | 51.1 |
| 538° C. (1000° F.) | 0.325 |
| 593° C. (1100° F.) | 0.130 |
| 648° C. (1200° F.) | 0.0378 |
| 5 mins. at 648° C. (1200° F.) | 0.0114 |
| 10 mins. at 648° C. (1200° F.) | 0.0055 |
| 15 mins. at 648° C. (1200° F.) | 0.0032 |

The requirements of one of the leading American safety associations for the approval of domestic electric heater appliances include—

(A) The resistance (impedance) of the insulation shall be of a value such that with the application of 120 volts, 60 cycles, between the electrical circuit and the frame of the appliance, the leakage current will not exceed 0.2 milliampere under each of the following conditions:

(1) Initially, as received, at existing test-room temperature and humidity.

(2) After exposure for 24 hours to an atmosphere of at least 85% relative humidity and 85° F. and while still under those conditions.

(3) At operating temperature after one hour of continuous operation, thermostatic cycling.

(B) Insulation must be of such a character as not only to be adequate initially, but also to have the necessary expectance of life with adequate performance.

In the development of suitable binders it was necessary, therefore, to consider the electrical insulation resistance both at high temperatures and after exposure to high relative humidities, as well as the effect of these conditions upon the mechanical integration of the products bonded therewith.

We have discovered that mica films associated with a binder which at red heat comprises a fused mixture of (a) metaphosphoric acid or one or more of its alkali metal salts, or both (hereinafter referred to as "metaphosphate"), or (b) such "metaphosphate" with one or more fused alkali metal borates, monoborates or metaborates, (hereinafter referred to as "fused borate"), and boron trioxide will, upon compression while still at red heat, yield bonded products having electrical insulation values which meet the exacting conditions of test, assembly, operation and use required today of the insulation for domestic electrical heater appliances.

The use of boron trioxide as a binder for mica films was described by McCulloch in U. S. Patent 1,386,008, but certain shortcomings in the properties of the bonded product have prevented its use on any considerable commercial scale. Thus, an important objection to the use of boron trioxide as heretofore employed has been its lack of physical and chemical stability to the action of water and water vapor. Upon continued exposure to high relative humidities, boron trioxide exhibits a marked tendency to crystallize so that mica plates bonded therewith decrease with time in hardness, adhesion, and mechanical integration. It is a prime requisite that composite high temperature-resistant mica plate shall retain its structural integration and mechanical strength when exposed to extreme atmospheric conditions, so that the chemical instability of boron trioxide in the presence of moisture presents a serious drawback to its use as a mica binder.

The fused glass-like metaphosphate and mixtures of these substances with "fused borate" are, on the other hand, very resistant to the action of water vapor and exhibit the necessary physical and chemical stability to permit mica plates bonded therewith to retain structural integration and mechanical strength after exposure to high relative humidities.

By using binders which contain the metaphosphate, or mixtures of the metaphosphate with the "fused borate" (or salts which form these glass-like materials upon fusion) in combination with boron trioxide, (including thermally decomposable boron oxide-containing compounds which yield a residue composed of boron trioxide upon fusion,) we have discovered that bonded products are obtained which are sufficiently high in electrical insulation resistance both at high temperatures and after exposure to high relative humidities and are essentially resistant to physical and chemical change at high temperature and after exposure to high relative humidities, so that such products satisfy the commercial requisements specified and desired for the insulation of domestic electric heater appliances and other purposes.

This invention is intended to include, therefore, bonding compositions comprising one or more components selected from each of the following groups A and B:

GROUP A (1) Fused metaphosphoric acid or the glass-like metaphosphates of the alkali metal group, or compounds which yield fused metaphosphoric acid or the glass-like alkali metal metaphosphates at high temperatures.

(2) Mixtures of fused metaphosphoric acid or the glass-like metaphosphates of the alkali metal group with the glass-like forms of the fused borates, monoborates, or metaborates of the alkali metal group, or compounds which yield these glass-like fused forms at high temperatures.

GROUP B

Boron trioxide, or compounds such as boric acid which yield a residue composed of boron trioxide at high temperatures.

The fused glass-like "metaphosphate" may be first prepared separately and incorporated as such in the binder formulas, or its formation may be effected directly in the mica plate during manufacture by first incorporating in the unfused bonding compositions salts which yield the fused "metaphosphate" at the temperature of manufacture of the mica plate.

The ammonium orthophosphates, for example, yield metaphosphoric acid when heated to the temperature range of manufacture of high temperature-resistant bonded mica plate. It is highly improbable that any trace of ammonia remains in the high-temperature fusion products of the ammonium orthophosphates, and it is our belief that a fused glass-like metaphosphoric acid, rather than an oxide of phosphorus, is formed. In confirmation of this belief we have found that metaphosphoric acid itself may be used in place of an ammonium orthophosphate in the original bonding compositions without essential change in the results obtained.

It is known that the monobasic alkali metal orthophosphates and the alkali metal-ammonium orthophosphates yield the glass-like alkali metal metaphosphates at the manufacturing temperature of the mica plate. Therefore, in the original bonding composition we may use one or more components selected from the group consisting of the ammonium orthophosphates, the monobasic alkali metal orthophosphates, the alkali metal-ammonium orthophosphates, metaphosphoric acid and the alkali metal metaphosphates.

The term "alkali metal borate" is intended to include the glass-like forms of the fused borates, monoborates and metaborates of the alkali metal group, and salts which yield these glass-like or fused forms at high temperatures. These fused forms may be prepared separately and incorporated in the original bonding compositions, or their formation may be effected directly in the process of manufacturing fused mica plate, by first incorporating, in the compositions as applied to the mica films, salts which yield these glass-like forms at the manufacturing temperature of the mica plate. For example, crystallized borax may be used as one component in the original bonding composition to yield a fused sodium borate in the finished composite product. In the tabulated series crystallized borax has been used as the alkali metal borate component because all of the bonded mica plates in these particular series were made with India mica films and at a manufacturing temperature of approximately 575–625° C. (1067–1157° F.). When potassium and lithium borates are used, higher temperatures are required to effect fusion. These may, therefore, be advantageously used with amber mica which has a higher decomposition temperature than India mica.

Boron trioxide may be used as such in the preliminary binder formula, as made up for use, or its formation may be effected directly in the process of manufacture of the mica plate by first incorporating in the composition as applied to the mica films one or more thermally-decomposable boron trioxide-forming compounds, such as boric acid, in part or entirely for boron trioxide; such compounds decompose chemically and leave a residue composed of boron trioxide when heated to the manufacturing temperature of the mica plate. In the claims herewith we have, for simplicity, consistently named boron trioxide as typical of the component of the composition which supplies this substance with the intent however that such claims shall include within their scope not only boron trioxide itself but also all useful equivalents thereof, for example any thermally-decomposable boron trioxide-forming compound as well as any desired combination of such materials.

The resulting glass-like substances formed by fusion of these bonding compositions at high temperatures differ from the true glasses in the following particulars:

(a) They are adhesive to mica when in a fused state, whereas all commercial low melting glasses that we have been able to obtain show marked lack of the necessary adhesion.

(b) The coefficients of expansion of the fused compositions are close to that of mica, while those of the low melting glasses are so different from that of mica that when fused in contact therewith and cooled the glass cracks, and the plate is correspondingly imperfect.

(c) The bonding efficiency of the major constituent in the bonding composition is enhanced by the presence of the other components, whereas ordinary glasses appear to have no major component that is, alone, essentially a mica adhesive, and no combination of components has been found in which any one factor has a noticeable effect of enhancing the adhesion of glass to mica, with the possible exception of fluorine compounds occasionally employed, which, however, in the common glasses tried failed to have sufficient effect to permit the use of glass as an efficient mica binder.

(d) The flowing point of the melted binder is distinctly lower and is in the range of the decomposition temperature of mica itself, while the so-called low melting glasses of commerce tried thus far still melt only at temperatures higher than the decomposition temperature of India mica itself.

In the construction of the mica plate, we may apply the binder composition which may consist of the unfused mixed components or which may be a pre-fused reaction product, between the mica films as a dry powder, as a paste, in aqueous solution, or dispersed or dissolved in an aqueous or organic solvent or mixture of solvents. Thereafter the mica plate so constructed is heated, and the fusion reaction effect in situ producing the reaction product bonding agent during the manufacture of the bonded plate.

In manufacturing the high temperature mica plate the assembly constructed as above is, as a preliminary step, first treated for removal of the solvent or dispersing medium by heating to a suitable temperature, ordinarily 60° C.–70° C. (140° F.–158° F.), under reduced pressure in a vacuum oven. This removal of the solvent or suspending medium, partial if aqueous and complete if organic, is preparatory to the final fusion reaction of the bonding composition used. The degree of vacuum and the heat treatment must be so related as to liberate the vapors in such a gentle way that the structure of the mica plate, i. e. the overlapping relation and flat position of its films remains unchanged at the end of this treatment. Some water may remain without being deleterious to the final fusion reaction but when an organic dispersing medium is used the solvent should be entirely removed at this stage in order to prevent the later formation of a charred residue, such as yielded by glycerine and its compounds, in the fused mica plate.

After this treatment the mica plate is subjected to temperatures of redness and to suitable compression to effect the chemical and physical changes necessary to produce the mechanical integration, thermal stability and other properties required of high-temperature-resistant mica plate.

In the tables the binder compositions are given for the mixtures, expressed in parts by weight of each component, used for application to the mica films in constructing the mica plate, and before fusion. The electrical resistance and current leakage values represent measurements made on the mica plated bonded with these compositions, after fusion; that is, after heating the composite mica plates to temperatures of redness in order to effect fusion and reaction of the bonding composition and subjecting them to adequate applied pressure.

In our thermal tests we measured the electrical insulation resistance of ten square inches of the test mica plate, 0.015'' in thickness, in a test clamp designed for the purpose. The resistances, which are expressed in megohms at 500 volts D. C., are absolute only for the specific conditions of test and serve, therefore, only as a basis for comparisons. The measurements were made during heating to 650° C. (1202° F.) and while the mica plate was kept at 650° C. for 15 minutes, the tabulated values being the minimum electrical insulation resistances measured at any time during the test.

Tables II and III show the electrical resistance of mica plates bonded with various typical improved compositions and illustrate clearly the marked effect of boron trioxide in increasing the electrical insulation resistance of these compositions, the increase in resistance effected with higher proportions of boron trioxide, and the increase in resistance at various elevated temperatures.

TABLE II

*Electrical insulation resistances of fused bonded mica plates at 650° C. (1202° F.)*

(FORMULAS GIVEN FOR BINDER COMPOSITIONS BEFORE FUSION)

(Parts by Weight)

| Alkali metal phosphate | Borax $Na_2B_4O_7.10H_2O$ | Boron Trioxide $B_2O_3$ | Min. elec. res. in megohms |
|---|---|---|---|
|  | *Parts* | *Parts* |  |
|  | All |  | 0.028 |
| 1 part $NaH_2PO_4.H_2O$ | 4 |  | 0.018 |
| 1 part $NaH_2PO_4.H_2O$ | 1 | 3 | 0.310 |
| 1 part $NaH_2PO_4.H_2O$ |  | 4 | 0.400 |
| 1 part $KH_2PO_4$ | 4 |  | 0.030 |
| 1 part $KH_2PO_4$ | 3 | 1 | 0.139 |
| 1 part $KH_2PO_4$ | 1 | 3 | 0.311 |
| 1 part $KH_2PO_4$ |  | 4 | 0.434 |
| 1 part $NH_4H_2PO_4$ | 4 |  | 0.021 |
| 1 part $NH_4H_2PO_4$ | 1.25 | 2.5 | 0.370 |
| 1 part $KNH_4H(PO_4)_2$ | 4 |  | 0.030 |
| 1 part $KNH_4H(PO_4)_2$ | 1.25 | 2.5 | 0.270 |

TABLE III

*Electrical insulation resistances of fused bonded mica plates at high temperatures*

(FORMULAS GIVEN FOR BINDER COMPOSITIONS BEFORE FUSION)

(Parts By Weight)

| Plate | $KH_2PO_4$ | Borax $Na_2B_4O_7.10H_2O$ | $B_2O_3$ |
|---|---|---|---|
| A | 1 | 4 |  |
| B | 1 | 3 | 1 |
| C | 1 | 1 | 3 |
| D | 1 |  | 4 |

| Temperatures | Electrical insulation resistance in megohms | | | |
|---|---|---|---|---|
|  | A | B | C | D |
| 482° C. (900° F.) | 17.0 | 102.3 | 206.7 | 51.4 |
| 538° C. (1000° F.) | 3.56 | 34.0 | 102.9 | 17.7 |
| 565° C. (1050° F.) | 1.41 | 8.40 | 20.5 | 10.2 |
| 620° C. (1150° F.) | 0.259 | 1.11 | 2.14 | 1.67 |
| 648° C. (1200° F.) | 0.091 | 0.386 | 0.658 | 0.780 |
| 5 min. at 648° C. (1200° F.) | 0.082 | 0.193 | 0.348 | 0.520 |
| 10 min. at 648° C. (1200° F.) | 0.038 | 0.193 | 0.312 | 0.466 |
| 15 min. at 648° C. (1200° F.) | 0.030 | 0.193 | 0.311 | 0.384 |

In our tests for determining the electrical insulation resistance of mica plates at conditions of high relative humidities and high summer temperatures, measured current leakage after exposure of the test mica plates, 0.015'' in thickness, in a humidity chamber to conditions of 85% relative humidity and 85° F. (29.4° C.) for 24 hours. The current leakage measurements, which are expressed in milliamperes at 115 volts A. C. serve (reciprocally) as an index of electrical insulation resistance. The tabulated values are absolute only for the specific conditions of test, and serve, therefore, only as a basis for comparison.

The results in Table IV are typical of these improved compositions, and illustrate the considerable effect of the incorporation of boron trioxide in decreasing the current leakage of mica plates bonded with these compositions.

TABLE IV

*Current leakages of fused bonded mica plates at 85% relative humidity and 85° F. (29.4° C.)*

(FORMULAS GIVEN FOR BINDER COMPOSITIONS BEFORE FUSION)

| Alkali metal phosphate | Borax $Na_2B_4O_7.10H_2O$ | Boron trioxide $B_2O_3$ | Current leakage in milliamperes |
|---|---|---|---|
|  | *Parts* | *Parts* |  |
| 1 part $NaH_2PO_4.H_2O$ | 4 |  | 0.395 |
| 1 part $KH_2PO_4$ | 4 |  | 0.34 |
| 1 part $KH_2PO_4$ | 1 | 3 | 0.15 |
| 1 part $NH_4H_2PO_4$ | 1.25 | 2.5 | 0.175 |
| 1 part $KNH_4H(PO_4)_2$ | 1.25 | 2.5 | 0.19 |

The tables refer specifically to the effect of these modified, improved inorganic bonding agents upon the electrical insulation resistances of mica plates bonded with them, both at high temperatures and after exposure to high relative humidities. However, it is to be understood that the bonding agents must in every case, regardless of percentage composition, satisfy also the other recognized requirements for binders for high temperature-resistant mica plate as described among the objects and in the subject matter of this specification.

Thus, it is necessary that the bonded mica insulation, in order to satisfy the assembly and operating conditions of the element units of electric heater appliances, must possess a high degree of mechanical hardness and integration to permit free punching, notching, and element-winding. In order to effect this integration, the bonding agents must exhibit a thermal behavior such that they will flow at red heat, and on cooling under compression, form clear, hard but resilient, glass-like films of a high degree of adhesion to adjacent mica surfaces.

Another property of any inorganic bonding agent in use as a binder for high temperature-resistant bonded mica plate is that it must show a low thermal coefficient of expansion, not greatly different from that of the mica itself, at all temperatures up to and including temperatures of redness, in order to prevent cracking, buckling and disruption of the mica plate when it is heated to and cooled under pressure from red heat during manufacture and in appliances.

Another important consideration is the durability, or mechanical stability, of the fused bonded mica plates. When used in domestic electric heater appliances the insulation must not only be adequate initially but also have the necessary expectancy of life with adequate performance. Durability of the insulation involves the maintenance of mechanical hardness and structural integration, of adhesion of the binder, and of resistance of the binder to physical and chemical change when the insulation is repeatedly subjected to temperatures of redness or exposed to conditions of high relative humidities.

The improved bonding agents herein described have been found to satisfy all of the specified criteria for binders for high temperature-resistant mica plate, and the fused mica plates bonded with these agents exhibit excellent mechanical integration and durability. They are essentially unaltered upon repeated subjection to red heat and upon exposure to conditions of high relative humidity.

In the consideration of durability we have determined that in these mixtures boron trioxide is the factor of improvement in thermal resistance, and that the "metaphosphate", or mixture of "metaphosphate" and "fused borate", is the factor of improvement in moisture-resistance. Suitable proportions have been employed to combine the desired improvement in both factors of durability or resistance to physical and chemical change, namely, upon subjection to high temperatures and after exposure to high relative humidities, and thus to obtain adequate durability of the integrated mica plate or other insulation.

The actual proportions and natures of the binder components in formulas used commercially are based upon the specific conditions of assembly, operation and use to which the bonded insulation may be subsequently applied. For example, if the product is intended for use in an appliance operating at usually high temperatures, as in many electric flatirons, one of the higher-melting alkali metal phosphates or alkali metal borates may be used. If the mechanical design of the appliance is such that it is conducive to high current leakage, as in certain types of space heaters, higher proportions of boron trioxide may be used to reduce current leakage to a minimum. If the product is to be used in appliances where the insulation may be exposed to high humidities, higher proportions of the alkali metal component are required to protect the mica plate from deterioration by reason of this environmental humidity. The limitations of proportions are, then, those set by the need for adequate electrical insulation resistance on the one hand, and adequate thermal resistance and moisture resistance on the other.

In the course of many experiments we have found that the unfused preferable bonding compositions may contain not less than about 20% or more than about 80% of each of the following two components: (1) at least one member of the group comprising the mono alkali metal orthophosphates and the ammonium orthophosphates (these substances forming glass-like metaphosphate material when fused) or, as an alternative, such a phosphate material with added alkali metal borate, and (2) a boron trioxide component within the scope of this term as hereinbefore explained.

For most purposes the optimum range of percentages in the unfused bonding compositions lies between 35 percent and 55 percent of metaphosphate radical-forming material or of the mixture of metaphosphate radical-forming material and alkali metal borate, the remaining percentage being made up of the boron trioxide component. In the fused composition bonding agent or binder the optimum range of percentage lies between 20 percent and 50 percent of "metaphosphate" component or of the mixture of "metaphosphate" and "fused borate" component, the remaining percentage being made up of boron trioxide.

With the type of binder described in this specification the exact temperature of manufacture is determined by the composition of the binder, particularly the temperature required to effect fusion of the specific alkali metal component used and the proportion of alkali metal component present. However, the temperature of manufacture should be below but as near as practicable to the decomposition temperature of the mica films themselves in order to obtain maximum fusion, adhesion, dehydration and resulting thermal resistance of the binder and to obtain in the mica plate those qualities most essential in subsequent conditions of assembly, use and operation. Manufacturing temperatures between 580° C. (1075° F.) and 650° C. (1202° F.) have been used with India mica (Muscovite) films, while with amber mica (phlogopite) films, temperatures up to 870° C. (1600° F.) have been employed.

The values given in the tables are not to be taken as representing specific or optimum limitations but rather as demonstrating the range of optimum proportions. Higher and lower proportions in the ranges given for the various components also often yield effective improvement with regard to special requirements of use.

When the term "unfused bonding components" or "unfused bonding composition" is used in the specification or claims, it is intended to mean the binder components or composition as used initially in the construction of the mica plate and which serve, when the mica plate is heated to the fusion temperatures and compressed, as the source of the actual high temperature reaction product bonding agent which then functions to bond the mica films and layers to produce a completely integrated composite mica plate. The "unfused bonding components" or "unfused bonding composition", which may be pre-fused, as described above, exhibit only a partial adhesion or bonding action in the initially-constructed mica plate, the fusion conditions of temperature and pressure being required to produce the complete bonding qualities required in the finished mica plate.

Although the invention has been described with particular emphasis upon the use of these compositions as binders for mica films, it is readily apparent that their usefulness may be extended to various types of insulating materials.

The preceding description relates to the preferred embodiment of the invention. Minor changes in details or combination with suitable other binders are intended to be included in the spirit and scope of this invention.

We claim:

1. The method of making a composite bonded insulating material, which comprises associating discrete particles of matter with an unfused bonding composition containing (1) at least one component selected from the group consisting of the metaphosphoric acid radical compounds comprising metaphosphoric acid and the alkali metal metaphosphates, and the metaphosphoric acid radical-forming compounds comprising the mono-alkali metal and the ammonium orthophosphates, (2) an alkali metal borate component and (3) a boron trioxide component, subjecting the said associated discrete particles of matter and unfused bonding composition to a temperature sufficient to effect thermal reaction of the components of said unfused bonding composition, and thereby to obtain a fused reaction product capable of and bonding said discrete particles of matter under pressure into an integral body with said fused reaction product formed in situ, and cooling under pressure the composite bonded product thus obtained.

2. The method of making a composite bonded insulating material, which comprises associating discrete particles of matter with an unfused bonding composition containing (1) at least one component selected from the group consisting of the metaphosphoric acid radical compounds comprising metaphosphoric acid and the alkali metal metaphosphates, and the metaphosphoric acid radical-forming components comprising the mono alkali metal and the ammonium orthophosphates, and (2) a boron trioxide component, subjecting the said associated discrete particles of matter and unfused bonding composition to a temperature sufficient to effect thermal reaction of the components of said unfused bonding composition and thereby to obtain a fused reaction product capable of and bonding said discrete particles of matter under pressure into an integral body with said fused reaction product formed in situ, and cooling under pressure the composite bonded product thus obtained.

3. The method of making a composite bonded insulating material, in accordance with claim 1, in which the discrete particles of matter consist of mica flakes.

4. The method of making a composite bonded insulating material, in accordance with claim 1, in which the discrete particles of matter consist of mica flakes, and the unfused bonding composition consists of from about 20 percent upwards to about 80 percent of a mixture of (a) at least one component selected from the group consisting of the metaphosphoric acid radical compounds comprising metaphosphoric acid and the alkali metal metaphosphates, and the metaphosphoric acid radical-forming compounds comprising the mono alkali metal and the ammonium orthophosphates and (b) an alkali borate component, and from about 80 percent downwards to about 20 percent of a boron trioxide component.

5. The method of making a composite bonded insulating material, in accordance with claim 1, in which the discrete particles of matter consist of mica flakes, and the unfused bonding composition consists of from about 35 percent upwards to about 55 percent of a mixture of (a) at least one mono-alkali metal orthophosphate and (b) an alkali metal borate component, and from about 65 percent downwards to about 45 percent of a boron trioxide component.

6. The method of making a composite bonded insulating material, in accordance with claim 1, in which the discrete particles of matter consist of mica flakes, and the unfused bonding composition consists of from about 35 percent upwards to about 55 percent of a mixture of (a) at least one ammonium orthophosphate and (b) an alkali metal borate component, and from about 65 percent downward to about 45 percent of a boron trioxide component.

7. The method of making a composite bonded insulating material, in accordance with claim 2, in which the discrete particles of matter consists of mica flakes.

8. The method of making a composite bonded insulating material, in accordance with claim 2, in which the discrete particles of matter consists of mica flakes, and the unfused bonding composition consists of from about 20 percent upwards to about 80 percent of at least one component selected from a group of metaphosphoric acid radical compounds comprising metaphosphoric acid and the alkali metal metaphosphates, and the metaphosphoric acid radical-forming compounds comprising the mono alkali metal and the ammonium orthophosphates, and from about 80 percent downwards to about 20 percent of a boron trioxide component.

9. The method of making a composite bonded insulating material, in accordance with claim 2, in which the discrete particles of matter consist of mica flakes, and the unfused bonding composition consists of from about 35 percent upwards to about 55 percent of a mono-alkali metal orthophosphate, and from about 65 percent downwards to about 45 percent of a boron trioxide component.

10. The method of making a composite bonded insulating material, in accordance with claim 2, in which the discrete particles of matter consists of mica flakes, and the unfused bonding composition consists of from about 35 percent upwards to about 55 percent of an ammonium orthophosphate, and from about 65 percent downwards to about 45 percent of a boron trioxide component.

11. The composite bonded insulating material resulting from subjecting to reaction temperature and pressure mica flakes associated with an unfused bonding composition consisting of from about 20 percent upwards to about 80 percent of a mixture of (a) at least one component selected from a group consisting of the metaphosphoric acid radical compounds comprising metaphosphoric acid and the alkali metal metaphosphates, and the metaphosphoric acid radical-forming compounds comprising the mono-alkali metal and the ammonium orthophosphates and (b) an alkali metal borate component, and from about 80 percent downwards to about 20 percent of a boron trioxide component.

12. The composite bonded insulating material, in accordance with claim 11, in which the unfused bonding composition consists of from about 35 percent upwards to about 55 percent of a mixture of (a) a mono alkali metal orthophosphate component and (b) an alkali metal borate component, and from about 65 percent downwards to about 45 percent of a boron trioxide component.

13. The composite bonded insulating material, in accordance with claim 11, in which the unfused bonding composition consists of from about 35 percent upwards to about 55 percent of a mixture of (a) an ammonium orthophosphate component and (b) an alkali metal borate component, and from about 65 percent downward to about 45 percent of a boron trioxide component.

14. The composite bonded insulating material, in accordance with claim 11, in which the unfused bonding composition consists of from about 35 percent upwards to about 55 percent of a mixture of (a) a mono alkali metal orthophosphate, (b) an ammonium orthophosphate and (c) an alkali metal borate component, and from about 65 percent downwards to about 45 percent of a boron trioxide component.

15. The composite bonded insulating material, in accordance with claim 11, in which the unfused bonding composition consists of from about 15 percent upwards to about 35 percent of ammonium dihydrogen orthophosphate component, from about 20 percent upwards to about 40 percent of crystallized borax component, and from about 65 percent downwards to about 45 percent of a boron trioxide component.

16. The composite bonded insulating material, in accordance with claim 11, in which the unfused bonding composition consists of from about 5 percent upwards to about 15 percent of sodium dihydrogen orthophosphate component, from about 10 percent upwards to about 30 percent of ammonium dihydrogen orthophosphate component, from about 20 percent upwards to about 40 percent of crystallized borax component, and from about 65 percent downwards to about 45 percent of a boron trioxide component.

17. The composite bonded insulating material resulting from subjecting to reaction temperature and pressure mica flakes associated with an unfused bonding composition consisting of from about 20 percent upwards to about 80 percent of at least one component selected from the group of the metaphosphoric acid radical compounds comprising metaphosphoric acid and the alkali metaphosphates, and the metaphosphoric acid radical-forming compounds comprising the mono alkali metal and the ammonium orthophosphates, and from about 80 percent downwards to about 20 percent of a boron trioxide component.

18. The composite bonded insulating material, in accordance with claim 17, in which the unfused bonding composition consists of from about 35 percent upwards to about 55 percent of mono alkali metal orthophosphate component, and from about 65 percent downwards to about 45 percent of a boron trioxide component.

19. The composite bonded insulating material, in accordance with claim 17, in which the unfused bonding composition consists of from about 35 percent upwards to about 55 percent of an ammonium orthophosphate component, and from about 65 percent downwards to about 45 percent of a boron trioxide component.

20. The composite bonded insulating material comprising mica flakes associated with a high temperature reaction product bonding agent, containing (1) at least one component selected from the group comprising metaphosphoric acid and the alkali metal metaphosphates, (2) a fused alkali metal borate component, and (3) boron trioxide.

21. The composite bonded insulating material comprising mica flakes associated with a high temperature reaction product bonding agent containing (1) at least one component selected from the group comprising metaphosphoric acid and the alkali metal metaphosphates, and (2) boron trioxide.

22. The composite bonded insulating material comprising mica flakes associated with high temperature reaction product bonding agent consisting of from about 20 percent upwards to about 50 percent of a mixture of (a) alkali metal metaphosphate and (b) fused alkali metal borate, and from about 80 percent downwards to about 50 percent of boron trioxide.

23. The composite bonded insulating material comprising mica flakes associated with a high temperature reaction product bonding agent consisting of from about 20 percent upwards to about 50 percent of a mixture of (a) metaphosphoric acid and (b) fused alkali metal borate, and from about 80 percent downwards to about 50 percent of boron trioxide.

24. The composite bonded insulating material comprising mica flakes associated with a high temperature reaction product bonding agent consisting from about 20 percent upwards to about 50 percent of a mixture of (a) alkali metal metaphosphate, (b) metaphosphoric acid and (c) fused alkali metal borate, and from about 80 percent downwards to about 50 percent of boron trioxide.

25. The composite bonded insulating material comprising mica flakes associated with a high temperature reaction product bonding agent consisting of from about 10 percent upwards to about 25 percent of metaphosphoric acid, from 10 percent upwards to about 25 percent of fused sodium borate, and from about 80 percent downwards to about 50 percent of boron trioxide.

26. The composite bonded insulating material comprising mica flakes associated with a high temperature reaction product bonding agent consisting of from about 2 percent upwards to about 10 percent of sodium metaphosphate, from about 8 percent upward to about 15 percent of metaphosphoric acid, from about 10 percent upward to about 25 percent of fused sodium borate, and from about 80 percent downwards to about 50 percent of boron trioxide.

27. The composite bonded insulating material comprising mica flakes associated with high temperature reaction product bonding agent consisting of from about 20 percent upwards to about 50 percent of an alkali metal metaphosphate, and from about 80 percent downwards to about 50 percent of boron trioxide.

28. The composite bonded insulating material comprising mica flakes associated with high temperature reaction product bonding agent consisting of from about 20 percent upwards to about 50 percent of metaphosphoric acid, and from about 80 percent downwards to about 50 percent of boron trioxide.

29. The composite bonded insulating material comprising mica flakes associated with a high temperature reaction product bonding agent consisting of from about 20 percent upward to about 50 percent of a mixture of (a) an alkali metal metaphosphate and (b) metaphosphoric acid, and from about 80 percent downward to about 50 percent of boron trioxide.

30. An insulator consisting of an insulating material bonded into an integral body with an associated bonding agent consisting of the high temperature reaction product of an unfused bonding composition containing from about 20 percent upwards to about 80 percent of a mixture of (a) at least one component selected from the group of the metaphosphoric acid radical compounds comprising metaphosphoric acid and the alkali metal metaphosphates, and the metaphosphoric acid radical-forming compounds comprising the mono alkali metal and the ammonium orthophosphates and (b) an alkali metal borate component, and from about 80 percent downwards to about 20 percent of a boron trioxide component.

31. An insulator consisting of an insulating material bonded into an integral body with an associated bonding agent consisting of the high-temperature reaction product of an unfused bonding composition containing from about 20 percent upwards to about 80 percent of at least one component selected from the group of the metaphosphoric acid radical compounds comprising metaphosphoric acid and the alkali metal metaphosphates, and the metaphosphoric acid radical-forming compounds comprising the mono alkali metal and the ammonium orthophosphates, and from about 80 percent downwards to about 20 percent of a boron trioxide component.

WILLIS A. BOUGHTON.
WILLIAM R. MANSFIELD.

CERTIFICATE OF CORRECTION.

Patent No. 2,196,973. April 16, 1940.

WILLIS A. BOUGHTON, ET AL.

It is hereby certified that error appears in the printed specification of the above numbered patent requiring correction as follows: Page 1, second column, line 37, for the word "resistance" read --resistances--; line 53, for "or" read --of--; page 2, first column, line 43, for "85% F." read --85° F.--; and second column, line 38, for "requisements" read --requirements--; page 5, first column, line 33, for "usually" read --unusually--; page 6, first column, lines 70 and 74, and second column, line 21, claims 7, 8 and 10 respectively, for "consists" read consist; page 7, second column, line 8, claim 25, for "from 10" read --from about 10--; and that the said Letters Patent should be read with this correction therein that the same may conform to the record of the case in the Patent Office.

Signed and sealed this 11th day of June, A. D. 1940.

(Seal)

Henry Van Arsdale,
Acting Commissioner of Patents.